(12) United States Patent
Oishi et al.

(10) Patent No.: US 9,069,231 B2
(45) Date of Patent: Jun. 30, 2015

(54) FOCAL PLANE SHUTTER AND OPTICAL APPARATUS

(71) Applicant: SEIKO PRECISION INC., Narashino-shi (JP)

(72) Inventors: Seiichi Oishi, Narashino (JP); Minori Murata, Narashino (JP); Hiroshi Takahashi, Narashino (JP); Shoichi Tokura, Narashino (JP)

(73) Assignee: SEIKO PRECISION INC., Narashino-shi (JP)

( * ) Notice: Subject to any disclaimer, the term of this patent is extended or adjusted under 35 U.S.C. 154(b) by 0 days.

(21) Appl. No.: 14/291,717

(22) Filed: May 30, 2014

(65) Prior Publication Data

US 2014/0376904 A1    Dec. 25, 2014

(30) Foreign Application Priority Data

Jun. 20, 2013  (JP) .................................. 2013-129949

(51) Int. Cl.
  *G03B 9/08*  (2006.01)
  *G03B 9/40*  (2006.01)

(52) U.S. Cl.
  CPC ....................................... *G03B 9/40* (2013.01)

(58) Field of Classification Search
  CPC .......................................................... G03B 9/18
  USPC ............................................................ 396/456
  See application file for complete search history.

(56) References Cited

U.S. PATENT DOCUMENTS

| 8,317,417 B2 * | 11/2012 | Viglione et al. | 396/453 |
| 2012/0183287 A1 * | 7/2012 | Takahashi et al. | 396/454 |
| 2012/0219280 A1 * | 8/2012 | Nishimura et al. | 396/456 |

FOREIGN PATENT DOCUMENTS

JP    2011-170226 A1    9/2011

* cited by examiner

*Primary Examiner* — Clayton E LaBalle
*Assistant Examiner* — Dennis Hancock
(74) *Attorney, Agent, or Firm* — Kratz, Quintos & Hanson, LLP (57) ABSTRACT

A focal plane shutter includes: a board including an opening; a shutter opening and closing the opening; a drive source driving the shutter; a drive lever driven by the drive source; a drive arm connected to the drive lever and driving the shutter; a restriction portion defining a stop position of the drive lever; and a buffering member elastically deformable, wherein, when the drive lever drives, abuts the restriction portion, and stops, at least one of the drive arm and the shutter temporarily abuts the buffering member, is spaced from the buffering member, and stops.

6 Claims, 7 Drawing Sheets

FOCAL PLANE SHUTTER AND OPTICAL APPARATUS

CROSS-REFERENCE TO RELATED APPLICATION

This application is based upon and claims priority to Japanese Patent Application No. 2013-129949 filed on Jun. 20, 2013, subject matter of this patent document is incorporated by reference herein in its entirety.

BACKGROUND (i) Technical Field

The present invention relates to focal plane shutters and optical apparatus.

(ii) Related Art

There is known a focal plane shutter equipped with a buffering member absorbing the impact caused by stopping of a shutter. For example, the buffering member is provided to abut a drive arm driving the shutter or the shutter at a stop position thereof. Such a focal plane shutter is disclosed in Japanese Unexamined Patent Application Publication No. 2011-170226.

During the stopping of the shutter, the shutter or the drive arm is maintained in abutment with such a buffering member. Therefore, variation in size of the buffering member might cause variation in stop position of the shutter, so that the positional accuracy of the stop position of the shutter might not be ensured.

Further, in a case where the shutter or the drive arm is maintained in abutment with the buffering member for a long time, the shutter or the drive arm might adhere to the buffering member and might be difficult to be spaced therefrom, as depending on a material thereof. Furthermore, the shutter or the drive arm might be deformed.

SUMMARY

It is therefore an object to provide a focal plane shutter and an optical apparatus capable of suppressing problems caused by a buffering member provided for absorbing impact caused by stopping of a shutter.

According to an aspect of the present invention, there is provided a focal plane shutter includes: a board including an opening; a shutter opening and closing the opening; a drive source driving the shutter; a drive lever driven by the drive source; a drive arm connected to the drive lever and driving the shutter; a restriction portion defining a stop position of the drive lever; and a buffering member elastically deformable, wherein, when the drive lever drives, abuts the restriction portion, and stops, at least one of the drive arm and the shutter temporarily abuts the buffering member, is spaced from the buffering member, and stops.

DETAILED DESCRIPTION

Figure 1:
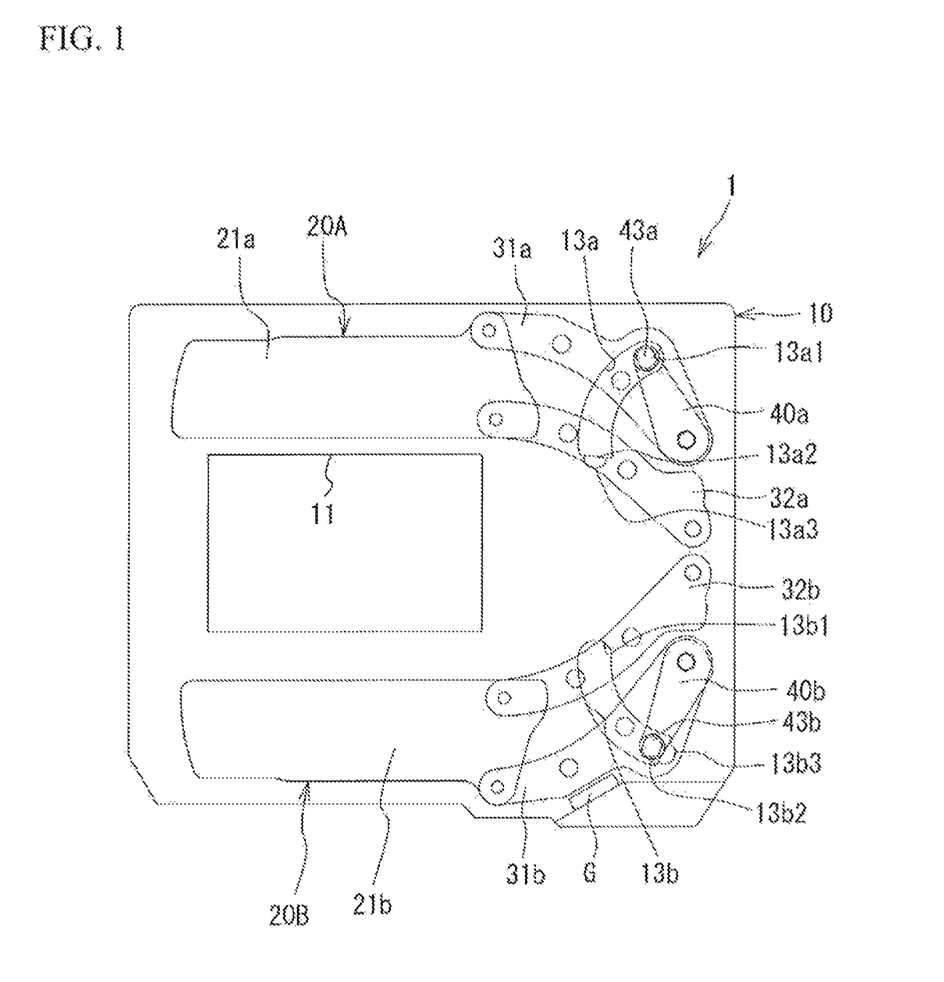
FIG. 1 is a front view of a focal plane shutter according to the present embodiment.
Figure 2:
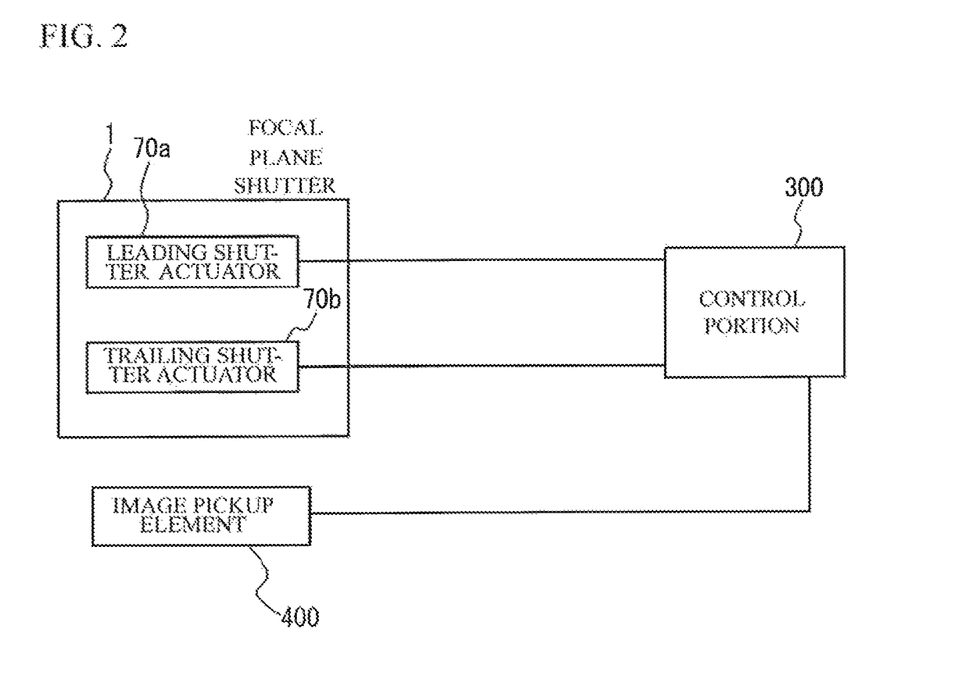
FIG. 2 is a block diagram of a camera including the focal plane shutter.
Figure 3A:
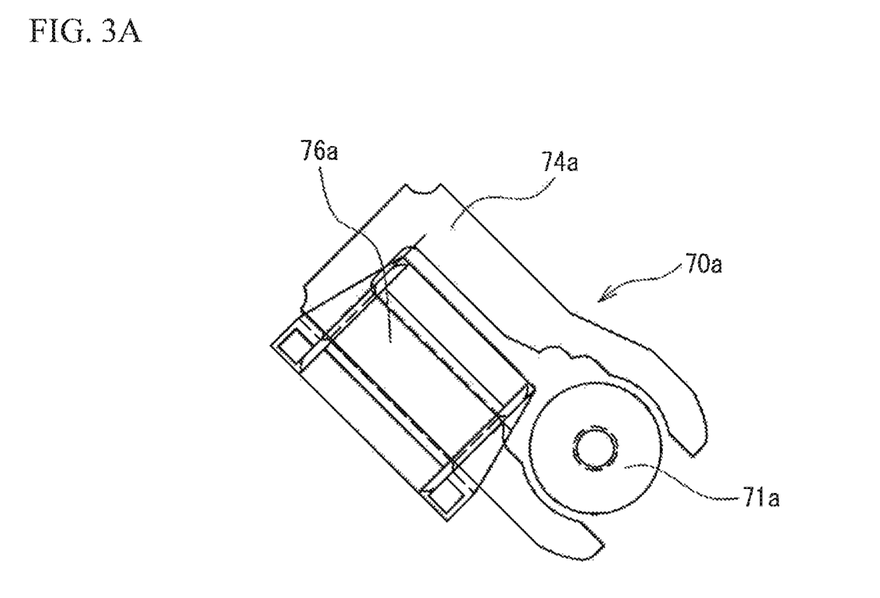
FIGS. 3A and 3B are respective explanatory views of a leading shutter actuator and a trailing shutter actuator.
Figure 3B:
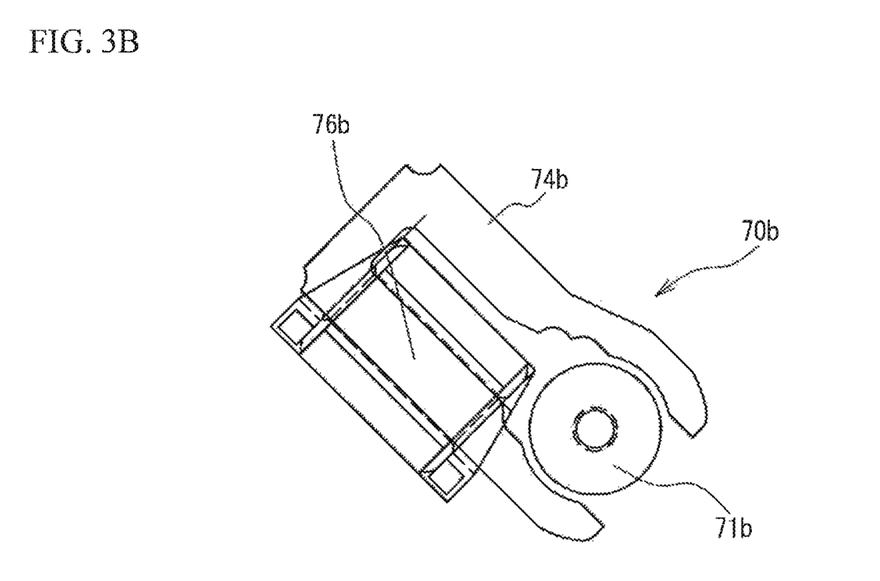

In the following, the embodiment will be described with reference to drawings. FIG. 1 is a front view of a focal plane shutter 1 according to the present embodiment. FIG. 2 is a block diagram of a camera including the focal plane shutter 1. FIGS. 3A and 3B are respective explanatory views of a leading shutter actuator 70a and a trailing shutter actuator 70b. The focal plane shutter 1 includes: a board 10 including an opening 11; a leading shutter 20A and a trailing shutter 20B opening and closing the opening 11; an arm 31a and an assist arm 32a for driving the leading shutter 20A; and an arm 31b and an assist arm 32b for driving the trailing shutter 20B. The arm 31a and the assist arm 32a are an example of a leading drive arm. The arm 31b and the assist arm 32b are an example of a trailing drive arm.

The board 10 is made of a synthetic resin, and includes the opening 11 having a rectangular shape. Although the leading shutter 20A and the trailing shutter 20B each include plural blades, blades 21a and 21b are only illustrated and other blades are omitted in FIG. 1. Each of the blades 21a and 21b is made of a synthetic resin, and is formed into a thin shape. Further, each of the arms 31a and 31b and assist arms 32a and 32b is made of a synthetic resin and has a thin plate shape. These arms are swingably supported by the board 10.

The focal plane shutter 1 includes a leading shutter actuator 70a (hereinafter, referred to as actuator) and a trailing shutter actuator 70b (hereinafter, referred to as actuator) as respective drive sources driving the leading shutter 20A and the trailing shutter 20B. The actuators 70a and 70b respectively include rotors 71a and 71b that are rotatable within a predetermined range in both directions. The actuators 70a and 70b will be described later in detail. The rotors 71a and 71b are respectively secured with a leading shutter drive lever (hereinafter referred to as a drive lever) 40a and a trailing shutter drive lever (hereinafter referred to as a drive lever) 40b serving as drive members.

The rotation of the rotor 71a causes the drive lever 40a to swing within a predetermined range. The drive lever 40a is formed with a drive pin 43a at its end. The drive pin 43a is fitted into a fitting hole of the arm 31a. Further, the board 10 is formed with an escape slot 13a releasing the drive pin 43a and having an arc shape. The abutment of the drive pin 43a with end portions 13a1 and 13a2 of the escape slot 13a restricts the swingable range of the drive lever 40a. Additionally, the end portion 13a1 is provided with a buffering member (not illustrated) such as a rubber, but may not be provided.

Additionally, the board 10 is provided with a positioning portion 13a3, and the drive pin 43a abuts the end portion 13a2 and the positioning portion 13a3. The positioning portion 13a3 protrudes from the front surface or the rear surface of the board 10, and has a thickness thicker than another portion. The drive pin 43a abuts both the end portion 13a2 and the positioning portion 13a3, thereby ensuring an area of the drive pin 43a abutting the board 10 when the drive pin 43a stops. Thus, the drive pin 43a is prevented from being tilted when the drive pin 43a abuts the board 10 and stops.

In the state where the leading shutter 20A recedes away from the opening 11, the drive pin 43a of the drive lever 40a abuts the end portion 13a1. In the state where the leading shutter 20A closes the opening 11, the drive pin 43a of the drive lever 40a abuts the end portion 13a2.

Likewise, the drive lever 40b includes a drive pin 43b fitting into a fitting hole of the arm 31b, and the drive pin 43b abuts end portions 13b1 and 13b2 of an escape slot 13b to restrict the swinging range of the drive lever 40b. Additionally, a buffering member such as a rubber (not illustrated) is provided at the end portion 13b1, but it may not be provided. In the state where the trailing shutter 20B recedes from the opening 11, the drive pin 43b of the drive lever 40b abuts the end portion 13b2. In the state where the trailing shutter 20B closes the opening 11, the drive pin 43b of the drive lever 40b abuts the end portion 13b1. Likewise, the board 10 is provided with a positioning portion 13b3, and the drive pin 43b abuts the end portion 13b2 and the positioning portion 13b3. The positioning portion 13b3 protrudes from the front surface or the rear surface of the board 10, and has a thickness thicker than smother portion. The escape slots 13a and 13b, the positioning portions 13a3 and 13b3 are examples of a restriction portion defining the stop positions of the drive levers 40a and 40b.

With the above configuration, the rotation of the rotor 71a causes the drive lever 40a to swing, thereby enabling the arm 31a to swing. Therefore, the leading shutter 20A moves to open or close the opening 11. Likewise, the rotation of the rotor 71b causes the drive lever 40b to swing, thereby enabling the arm 31b to swing. Therefore, the trailing shutter 20B moves to open or close the opening 11.

A rubber G is provided in the board 10. The rubber G does not abut the arm 31b in the finished state of the charging operation of the trailing shutter 20B. However, the rubber G is provided in such a position as to temporarily abut the arm 31b to absorb the impact thereof at the time when the trailing shutter 20B drives and stops in the charging operation. It is therefore possible to, for example, prevent damage to the arm 31b due to abutment of the drive pin 43b with an edge of a fitting hole of the arm 31b into which the drive pin 43b is fitted. For example, it is possible to prevent a gap between the drive pin 43b and the fitting hole of the arm 31b near the opening 11. The rubber G is an example of a buffering member. The buffering member is not limited to be made of rubber, and may be made of another material with elasticity such as silicone.

Thus, the escape slots 13a and 13b respectively restrict the swinging ranges of the drive levers 40a and 40b. In other words, the escape slots 13a and 13b respectively restrict the rotational ranges of the rotors 71a and 71b. This restricts the reciprocating ranges of the leading shutter 20A and the trailing shutter 20B. In the fully opened state in FIG. 1, the drive pin 43a and 43b of the drive levers 40a and 40b respectively abut the end portions 13a2 and 13b2, so that the escape slot 13a restricts the drive lever 40a and the rotor 71a from swinging clockwise from the fully opened state in FIG. 1. The escape sloe 13b restricts the drive lever 40b and the rotor 71b from swinging counterclockwise from the fully opened state in FIG. 1. Thus, in the fully opened state in FIG. 1, the leading shutter 20A and the trailing shutter 20B are restricted from further moving away from the opening 11.

A description will be given of a configuration of a camera equipped with the focal plane shutter 1. As illustrated in FIG. 2, the camera includes: the focal plane shutter 1; a control portion 300; and an image pickup element 400. The control portion 300 controls an operation of the whole camera and includes a CPU, a ROM, and a RAM. Additionally, the camera includes lenses, not illustrated in FIG. 2, for adjusting a focal length.

The control portion 300 controls energization states of the coils of the actuators 70a and 70b. The control portion 300 is an example of a drive control portion. The light enter the image pickup element 400 through the opening 11, and the image pickup element 400 changes an object image formed by the entered light into electric signals. The image pickup element 400 is, for example, a CCD or a CMOS.

Additionally, there is not provided a set member for respectively positioning the leading shutter 20A and the trailing shutter 20B at charging positions. This is because the leading shutter 20A and the trailing shutter 20B can be positioned at the charging positions by the rotors 71a and 71b that are rotatable in both directions.

The actuators 70a and 70b are supported on the board 10. The actuators 70a and 70b respectively drives the drive levers 40a and 40b. The actuator 70a includes a rotor 71a rotatably supported by the board 10, a stator 74a excited to generate magnetic force between the stator 74a and the rotor 71a, and a coil 76a for exciting the stator 74a. The rotor 71a is a permanent magnet that is energized to have different polarities in the circumferential direction. A rotation axis of the rotor 71a is connected to the spindle of the drive levers 40a. Accordingly, energization to the coil 76a causes the rotor 71a to rotate so that the drive lever 40a rotates. The rotation of the drive lever 40a causes the leading shatter 20A to drive. And also, opposite energization to the coil 76a causes the rotor 71a to rotate in the reverse direction so that the leading shutter 20A drive in the direction opposite to the direction described above. Likewise, as for the actuator 70b, the energization to the coil 76b causes the rotor 71b of the actuator 70b, whereby the drive lever 40b rotates, so that the trailing shutter 20B moves. Also, opposite energization to the coil 76b causes the trailing shutter 20B to move in the direction opposite to the direction mentioned above. Additionally, the rotor 71a and the drive lever 40a may be indirectly connected through a gear or the like. That is, the drive lever 40a has only to rotate in response to the rotation of the rotor 71a.

Next, a description will be given of the operation of the focal plane shutter 1. FIG. 1 illustrates an initial state of the focal plane shutter 1. In the initial state, as illustrated in FIG. 1, the leading shutter 20A and the trailing shutter 20B recedes away from the opening 11.

A release button of the camera is pushed to start a charging operation. When the charging operation starts, the coil 76a of the actuator 70a is energized, so the leading shutter 20A moves to close the opening 11.

Figure 4:
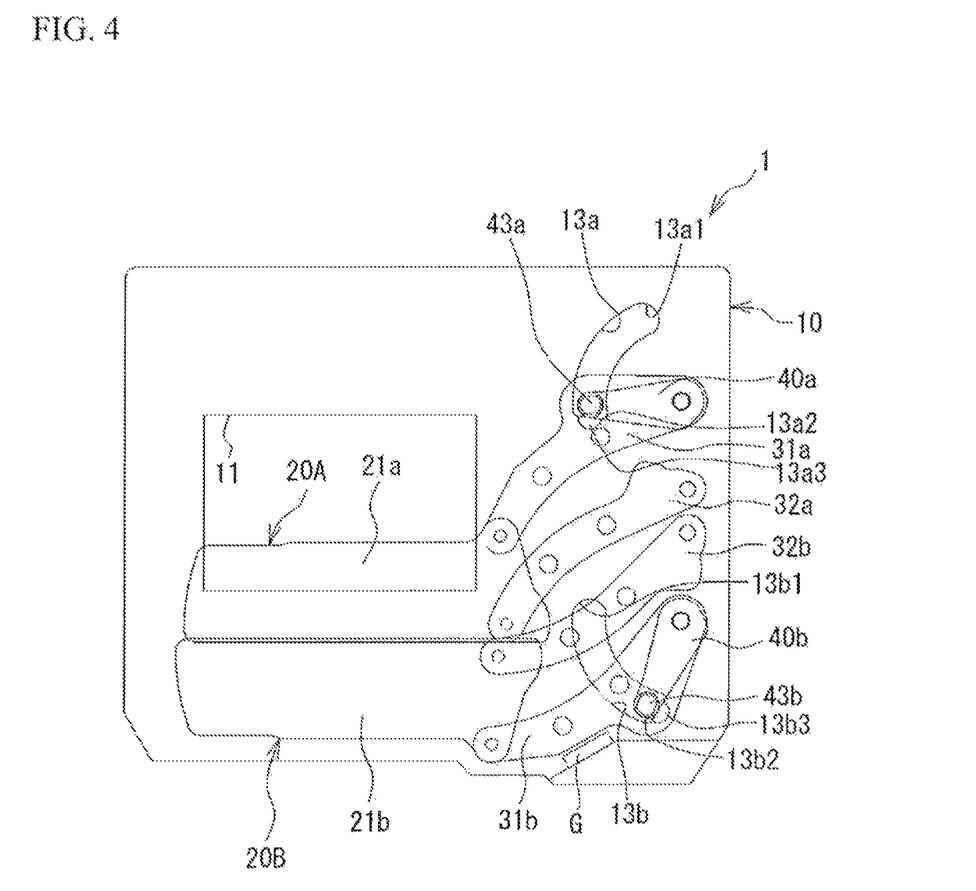
FIG. 4 is an explanatory view of an operation of the focal plane shutter.

After that, the energization of the coils 76a and 76b of the actuators 70a and 70b is stopped in the state where the leading shutter 20A closes the opening 11 and the trailing shutter 20B are positioned away from the opening 11. In such a way, the charging operation is finished. FIG. 4 illustrates the focal plane shutter 1 in the state where the charging operation is finished. Further, in the present embodiment, even after the energization is stopped, the charging finished state is maintained by the detent torque of the rotors 71a and 71b.

When a predetermined rest period elapses after the charging operation, an exposure operation starts. When the exposure operation starts, the coil 76a of the actuator 70a is energized, and the leading shutter 20A moves to open the opening 11. After a predetermined period elapses from the time when the coil 76a of the actuator 70a is energized, the coil 76a of the actuator 70b is energized, so the trailing shutter 20B moves to close the opening 11. When the leading shutter 20A moves fully away from the opening 11 and the trailing shutter 20B fully closes the opening 11, the energization of the coils 76a and 76b of the actuators 70a and 70b are stopped. In such a way, the exposure operation is finished. A period from the time when the reading shutter 20A starts moving to open the opening 11 to the time when the trailing shutter 20B fully closes the opening 11 is referred to as an exposure period.

Figure 5:
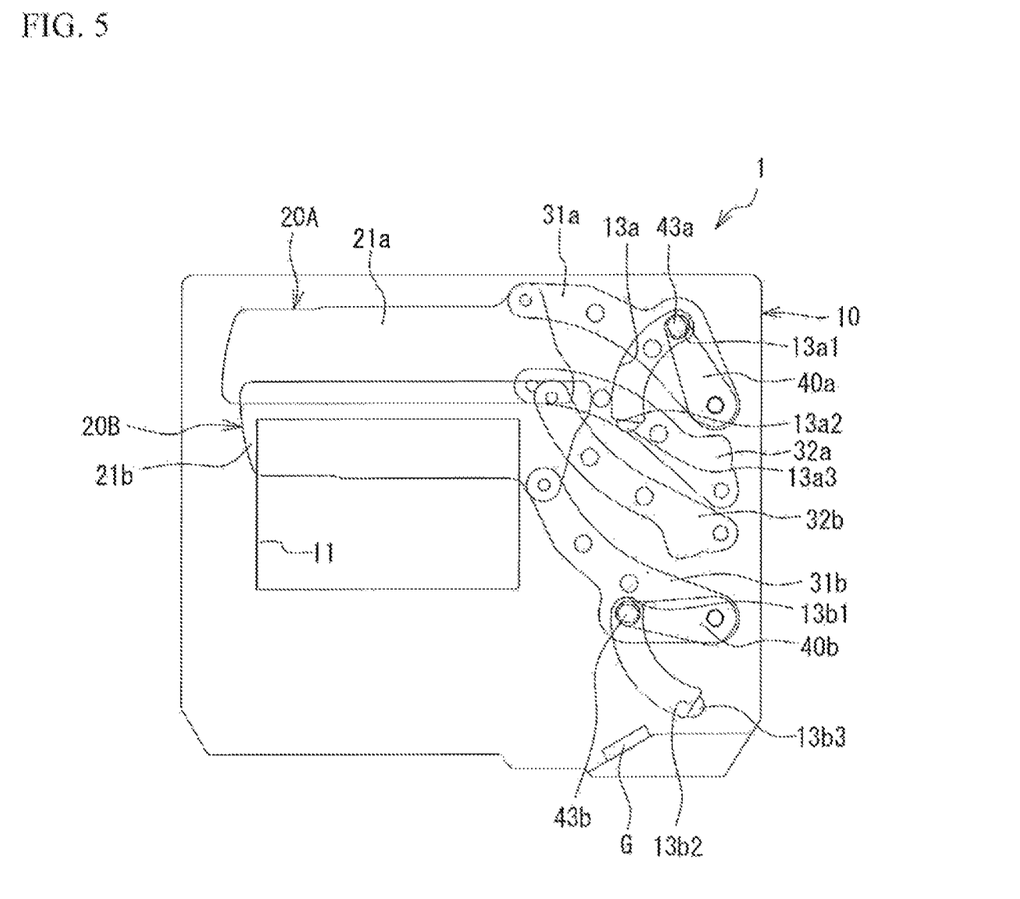
FIG. 5 is an explanatory view of an operation of the focal plane shutter.

FIG. 5 illustrates the state of the focal plane shutter 1 after the exposure operation is finished.

After the exposure operation is finished, the data are read from the image pickup element 400 by the RAM of the control portion 300 or memory of the camera side. Next, the coil 76b of the actuator 70b is energized, and the trailing shutter 20B moves away from the opening 11. Thus, the state returns to the initial state illustrated in FIG. 1.

Figure 6:
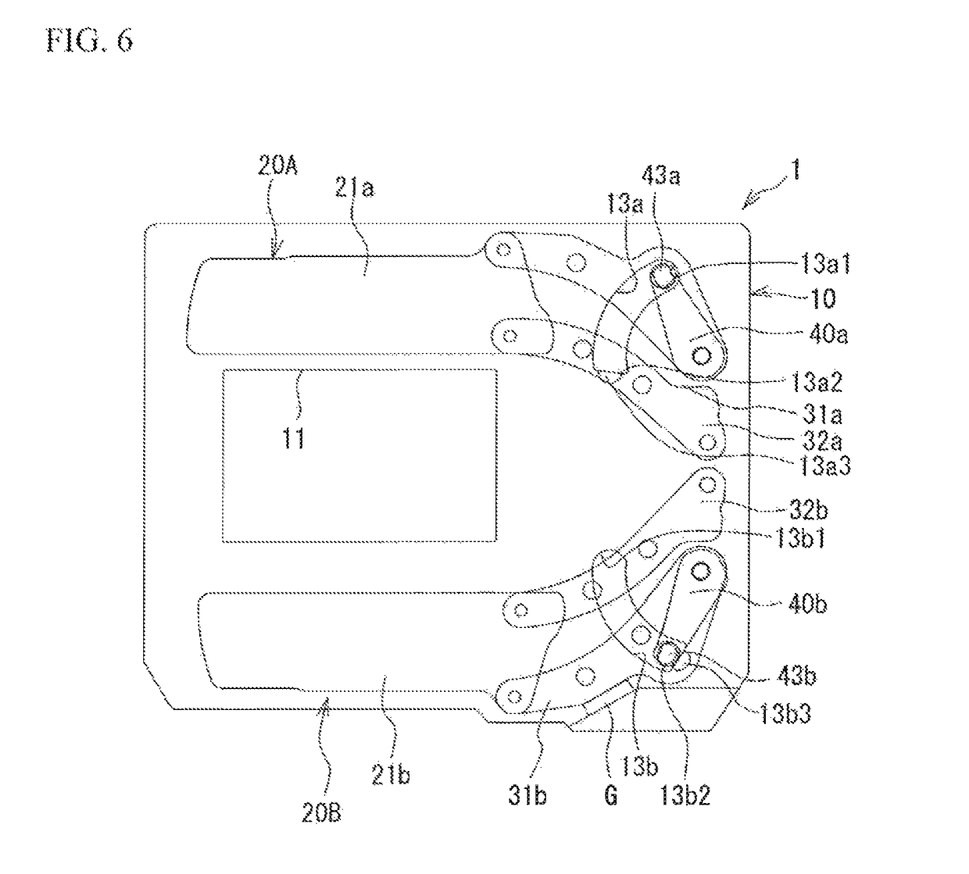
FIG. 6 is an explanatory view of an operation of the focal plane shutter.
Figure 7A:
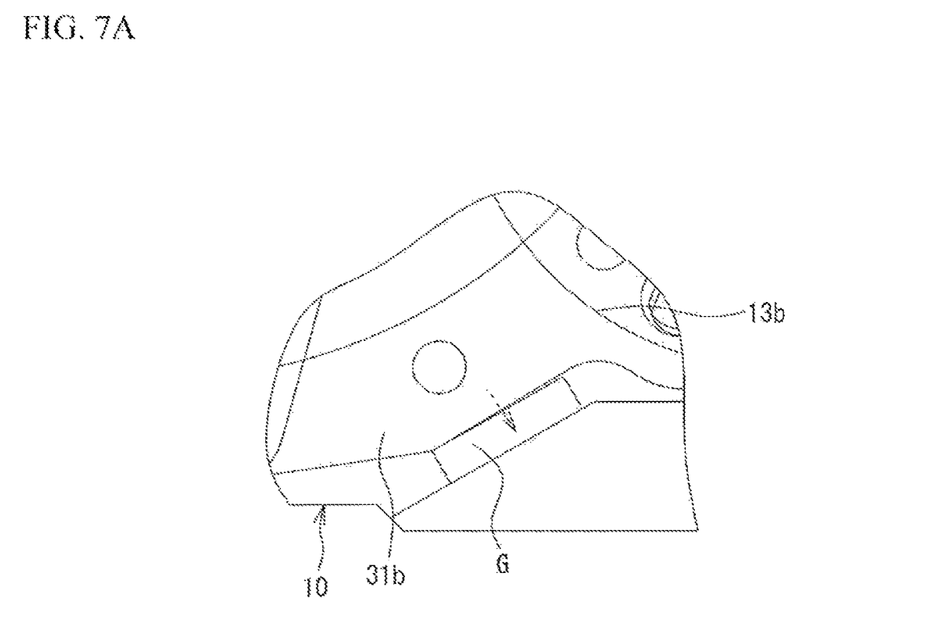
FIGS. 7A and 7B are enlarged views of a buffering member and an arm when the trailing shutter stops.
Figure 7B:
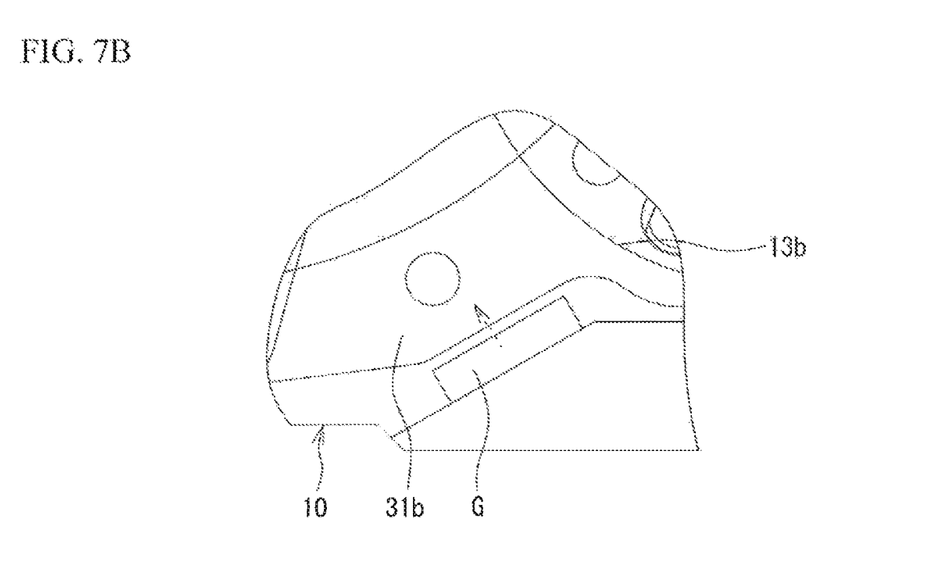

Herein, when the trailing shutter 20B moves away from the opening 11, the arm 31b temporarily abuts the rubber G as illustrated in FIG. 6. FIG. 7A is an enlarged view when the arm 31b abuts the rubber G. After that, the arm 31b is spaced from the rubber G. FIG. 7B is an enlarged view when the arm 31b is spaced from the rubber G.

Just when the drive pin 43b of the drive lever 40b swings and abuts the end portion 13b2 and the positioning portion 13b3, the arm 31b tends to further swing by its inertial force and the trailing shutter 20B tends to further move away from the opening 11, Therefore, just when the drive lever 40b is stopped by the abutment of the drive pin 43b thereof with the end portion 13b2 and the positioning portion 13b3, the arm 31b temporarily abuts the rubber G in accordance with the inertial force. Thus, the impact of the arm 31b is absorbed by the rubber G. After the arm 31b abuts the rubber G, the arm 31b is spaced from the rubber G in the state where the drive pin 43b is kept stopped. For example, this is because that there is some gap between the drive pin 43b and the fitting hole of the arm 31b through which the drive pin 43b penetrates, and that the arm 31b is positionally displaced with respect to the drive lever 40b by the gap while the inertial force exerts on the arm 31b. Further, when the inertial force exerts on the arm 31b, the arm 31b might be temporarily deformed since the arm 31b has a thin plate shape. For this reason, while the inertial force exerts on the arm 31b after the drive lever 40b swings and stops, the arm 31b abuts the rubber G. After the inertial force on the arm 31b disappears, the arm 31b returns to an original state and is spaced from the rubber G. In other words, the position of the rubber G is set such that the arm 31b temporarily abuts the rubber G when the drive lever 40b is quickly stopped by abutting the end portion 13b2 and the positioning portion 13b3 in the state where the drive lever 40b swings in a constant speed. Additionally, the drive pin 43b of the drive lever 40b is maintained in abutment with the end portion 13b2 and the positioning portion 13b3 by the detent torque of the rotor 71b after the energization of the actuator 70b is cut.

In this way, just when the drive pin 43b of the drive lever 40b abuts the end portion 13b2 and the positioning portion 13b3, the arm 31b tends to further swing by its inertial force. However, in this case, since the arm 31b abuts the rubber G, this suppresses the damage to the arm 31b due to the abutment of the drive pin 43b with the edge of the fitting hole of the arm 31b into which the drive pin 43b fits. For example, this suppresses the increased gap between the drive pin 43b and the fitting hole of the arm 31b near the opening 11.

If the gap near the opening 11 is increased, the moving distance of the drive pin 43b required to abut the fitting hole of the arm 31b is increased when the rotor 71b rotates such that the trailing shutter 20B moves toward the opening 11. Thus, the timing when the trailing shutter 20B starts moving is delayed, so that the variation in the exposure period by the trailing shutter 20B is increased. However, the present embodiment suppresses the increase in the gap between the drive pin 43b and the fitting hole, thereby suppressing the increase in the variation in the exposure period by the trailing shutter 20B.

Further, in the present embodiment, the arm 31b does not abut the rubber G in the state where the inertial force on the arm 31b disappears. This can solve problems caused by the long-term abutment of the arm 31b with the rubber G. For example, this suppresses the arm 31b from being difficult to be separated from the rubber G, and suppresses the warp or the deformation of the arm 31 caused by urging the arm 31b against the rubber G.

Further, since the arm 31b does not abut the rubber G, the positional accuracy of the arm 31b is ensured in the state where the trailing shutter 20B stops. This is because there is some variation in size of the rubber G by forming and that the positional accuracy of the arm 31b is difficult to be ensured if the arm 31b always abuts the rubber G. Since the arm 31b is connected to the trailing shutter 20B, the positional accuracy of the arm 31b is ensured, and the trailing shutter 20B of the positional accuracy is also ensured. Specifically, in the present embodiment, the position where the trailing shutter 20B recedes from the opening 11 is also the position where the trailing shutter 20B starts moving in the charging operation. Therefore, the positional accuracy of the trailing shutter 20B in the position to start in the charging operation is ensured, thereby suppressing the variation in the exposure period by the trailing shutter 20B.

In addition, the rubber G may be provided in such a position that both the trailing shutter 20B and the arm 31b temporarily abut the rubber G, and may be provided in such a position that only the trailing shutter 20B abuts the rubber G. Further, a buffering member may be provided so as to be temporarily abutted by at least one of the trailing shutter 20B and the assist arm 32b when the trailing shutter 20B closes the opening 11 and stops.

Furthermore, a buffering member may be provided so as to be temporarily abutted by at least one of the leading shutter 20A and the assist arm 32a when the leading shutter 20A closes the opening 11 and stops. Moreover, a buffering member may be provided so as to be temporarily abutted by at least one of the leading shutter 20A and the arm 31a when the leading shutter 20A stops away from the opening 11.

In addition, the focal plane shutter 1 according to the present embodiment is a normally open type that maintains the closed state of the opening 11 in the initial state. Thus, as for the camera in the present embodiment, movie output from the image pickup element 400 can be displayed on a monitor or the like in real time.

The focal plane shutter may be a normally closed type that maintains the opened state of the opening 11 in the initial state. In this case, the exposure operation is performed from the state where the opening 11 is closed. After the exposure operation, the leading shutter 20A and the trailing shatter 20B move to the initial state while maintaining the closed state of the opening 11.

In the present embodiment, the actuators 70a and 70b respectively drive the leading shutter 20A and the trailing shutter 20B. However, the present invention is not limited to this arrangement. For example, an electromagnet and a spring may function as driving the drive lever and the shutter. In this case, the drive lever is provided with an iron piece absorbed to the electromagnet, and the drive lever is biased by the spring to move sway from the electromagnet. In the state where the iron piece of the drive lever is absorbed to the electromagnet, the energization state of the electromagnet is changed. As a result, the iron piece moves away from the electromagnet and the drive lever swings away from the electromagnet in accordance with the biasing force of the spring.

While the preferred embodiments of the present invention have been illustrated in detail, the present invention is not limited to the above-mentioned embodiments, and other embodiments, variations and modifications may be made without departing from the scope of the present invention.

The focal plane shutter according to the present embodiment can be employed in an optical apparatus such as a still camera or a digital camera.

Also, although the blades and the arms that are made of a synthetic resin have been described in the present embodiment, they may be made or a thin-shaped metal. In the above embodiment, the leading shutter and the trailing shutter are each composed of four blades. However, the leading shutter and the trailing shutter are not limited to these arrangements. The leading shutter and the trailing shutter may be each composed of two to five blades.

The invention claimed is:

1. A focal plane shutter, comprising:
a board including an opening;
a shutter opening and closing the opening;
a drive source driving the shutter;
a drive lever driven by the drive source;
a drive arm connected to the drive lever and driving the shutter;
a restriction portion defining a stop position of the drive lever; and
a buffering member elastically deformable,
wherein the drive lever drives, abuts the restriction portion, and stops,
wherein when the drive lever is stopped,
at least one of the drive arm and the shutter temporarily abuts the buffering member, is spaced from the buffering member, and stops,
so that the at least one of the drive arm and the shutter stops and is spaced from the buffering member in a state where the drive lever stops and abuts the restriction portion.

2. The focal plane shutter of claim 1, wherein when the drive lever is stopped by the restriction portion, the shutter is positioned at a position where the shutter starts in an exposure operation.

3. The focal plane shutter of claim 1, wherein:
the shutter includes a leading shutter and a trailing shutter;
the drive arm includes a leading shutter drive arm and a trailing shutter drive arm respectively driving the leading shutter and the trailing shutter; and
at least one of the trailing shutter drive arm and the trailing shutter temporarily abuts the buffering member, is spaced from the buffering member, and stops.

4. The focal plane shutter of claim 1, wherein:
the drive arm temporarily abuts the buffering member; and
the shutter does not abut the buffering member.

5. The focal plane shutter of claim 1, wherein the drive source is an actuator.

6. An optical apparatus comprising a focal plane shutter, comprising:
a board including an opening;
a shutter opening and closing the opening;
a drive source driving the shutter;
a drive lever driven by the drive source;
a drive arm connected to the drive lever and driving the shutter;
a restriction portion defining a stop position of the drive lever; and
a buffering member elastically deformable,
wherein the drive lever drives, abuts the restriction portion, and stops,
wherein when the drive lever is stopped,
at least one of the drive arm and the shutter temporarily abuts the buffering member, is spaced from the buffering member, and stops,
so that the at least one of the drive arm and the shutter stops and is spaced from the buffering member in a state where the drive lever stops and abuts the restriction portion.

\* \* \* \* \*